March 15, 1955 R. L. BERGMANN 2,704,188
WATER HEATER
Filed April 16, 1952
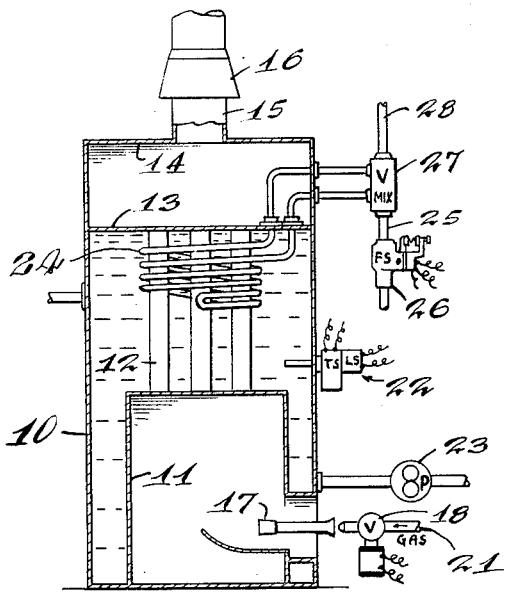
FIG-1-
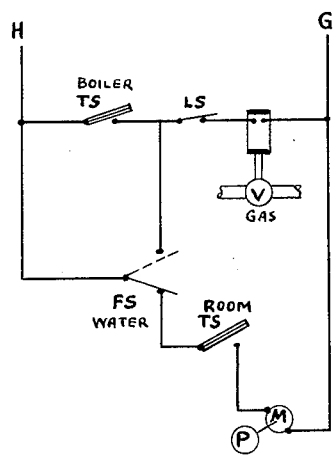
FIG-2-
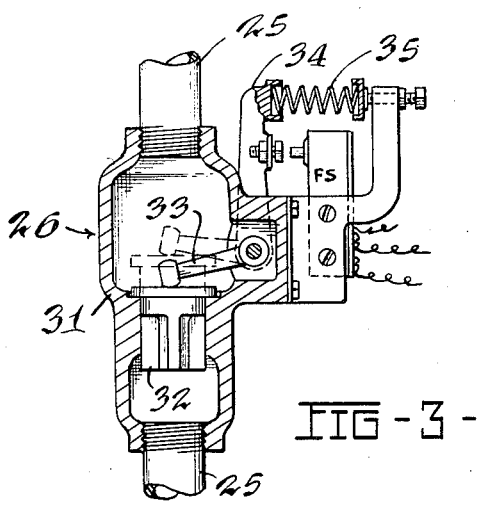
FIG-3-
INVENTOR:
R. L. BERGMANN.
BY
Charles S. Haughey
AGENT

United States Patent Office 2,704,188
Patented Mar. 15, 1955

2,704,188

WATER HEATER

Richard L. Bergmann, Columbus, Ohio, assignor to Surface Combustion Corporation, Toledo, Ohio, a corporation of Ohio Application April 16, 1952, Serial No. 282,586

9 Claims. (Cl. 237—8)

This invention relates to water heaters and controls therefor, and more particularly to water heaters adapted to heat water used for several purposes.

When water is heated by a burner in a water heater subject to control by thermostat responsive means, there will ordinarily be a time delay after hot water is initially drawn from the heater until the body of water controlled and heated by the burner is sufficiently cooled to affect the thermostat and thus turn on the burner. The present invention avoids that lost heating time, and effectively increases the capacity of a heater to heat water in a given period of time.

For a consideration of what I believe to be novel and my invention, attention is directed to the following disclosure and the claims at the end thereof.

In the drawing:

Fig. 1 is a vertical sectional view of a water heater according to this invention, Fig. 2 is a schematic electrical control diagram applicable to the heater of Fig. 1, and Fig. 3 is a sectional view of a flow switch of Fig. 1.

This invention provides a water heater with two thermostats comprising switches TS and LS responsive to temperature of water in the heater, flow responsive means responsive to flow of water through the heater, heating means for heating water in the heater, and control means for normally controlling the heating means responsive to one of the thermostats, and for controlling the heating means responsive to the other thermostat when the flow responsive means responds to a flow rate greater than a certain rate.

Referring to the drawings, a water heater illustrated in Fig. 1 comprises an outer shell 10 and a fire box 11 forming between them a space for water to be heated. Flue tubes 12 extend upwards from the firebox to a tube sheet 13 forming with the upper end of the shell 10 and a cover 14 a flue gas chamber which discharges through flue pipe 15 and draft hood 16. A gas burner 17 is supplied with fuel gas through solenoid operated gas valve 18 in gas pipe 21. The gas burner is operated, through the solenoid valve 18, responsive to a thermostat element in assembly 22 which comprises a temperature control switch TS and a limit switch LS. Ordinarily the burner is operated by opening valve 18 when the thermostat calls for heat and closes control switch TS, as for, example when the water temperature drops below 165° F. The valve 18 will remain open until the thermostat rises to 175° F., at which time the water heater, or "boiler," thermostat will open control switch TS and thus close the gas valve. It is understood that conventional pilot and burner safety devices, not shown, will ordinarily be used. A high temperature limit switch LS is built into the thermostat which opens at 185° F., opening the circuit to the gas valve to close that valve. Water is delivered from a house heating system through a motor operated pump or circulator 23 to the water heater subject to demand for heat as sensed by a room thermostat, not shown except for the room thermostat switch room TS in Fig. 2. The water heater is thus independently controlled to maintain a supply of hot water for the house heating system.

A domestic tap water heating system is also incorporated into this water heater. A water heating coil 24 is immersed in the water of the heater, shown as wrapped around the flue tubes 12. Water is supplied to the tap water heating coil 24 through water supply pipe 25, a flow responsive switch 26 (illustrated in Fig. 3) and through a mixing valve 27. Water from the coil 24 passes through outlet pipe 28 and is delivered to the tap. The mixing valve 27 is designed to bleed cold water from the supply pipe 25 into the outlet pipe 28 to temper water from the coil 24 and maintain tap water at a desired temperature such as 140° F.

Since the drawing of tap water from the coil 24 does not instantly affect the thermostat in assembly 22, a sustained draw of tap water will remove considerable heat from the water of the water heater before the burner is turned on responsive to tap water demand, hence the capacity of the unit to heat water is correspondingly reduced. To avoid this result, the flow responsive switch 26 is set to operate an electrical switch FS in Fig. 2 at a minimum rate of water flow somewhat less than that which the heater is capable of continuously heating—for example, in a heater which is capable of continuously supplying heated tap water at the desired temperature at a flow rate of two gallons per minute, the flow switch might be set to operate at a flow rate of one gallon per minute.

The flow switch 26 comprises a valve body 31 interposed in the water supply pipe 25 with a plunger type valve member 32 therein, a valve member follower 33 hingedly mounted on the valve body and externally connected to arm 34 which is subject to an adjustable compression spring 35 which normally tends to close the plunger type valve. As water flows through the valve body, the plunger member 32 moves, the follower 33 and arm 34 also move and operate a fast acting electrical flow switch FS mounted on the body.

As shown in the control circuit of Fig. 2, electric current is supplied from a hot line H through the water heater, or boiler, thermostat TS and the limit switch LS to the solenoid of the gas valve, and to ground G. Electric current is also supplied from the hot line H through the flow switch FS in the non-flow position through a room thermostat Room TS to the motor M of the pump 23 and to ground G. When the flow switch moves to flow position, the circuit to the room thermostat and the water pump is broken to prevent circulating of heating water during high demand for hot tap water, and a circuit is made through the limit switch LS, the solenoid gas valve and to ground, thus by-passing the thermostat switch TS. This results in constituting the limit switch LS a tap water thermostat for the water heater, and the tap water thermostat thus calls for heat any time when flow of tap water exceeds a minimum rate and the thermostat limit switch is at less than 185° F.

I claim:

1. Heating apparatus, comprising, a hot water boiler having an outlet adapted for connection to a supply line for a hot water radiator and an inlet adapted for connection to a return line from the radiator; a circulator adapted to force water from the boiler through the supply line, radiator and return line; a domestic water supply heat exchanger in said boiler having an inlet adapted for connection to a cold water supply conduit and an outlet adapted for connection to a hot water service conduit, and a control for said circulator connected with one of said conduits and directly responsive to flow therein for stopping said circulator.

2. Heating apparatus, comprising, a hot water boiler having an outlet adapted for connection to a supply line for a hot water radiator and an inlet adapted for connection to a return line from the radiator; a pump adapted to force water from the boiler through the supply line, radiator and return line; electrical means for operating said pump, a switch in circuit with said means, a domestic water supply heat exchanger in said boiler having an inlet adapted for connection to a cold water supply conduit and an outlet adapted for connection to a hot water service conduit, and a control for said circulator connected with one of said conduits and directly responsive to flow and absence of flow therein for respectively opening and closing said switch.

3. Heating apparatus, comprising, a hot water boiler having an outlet adapted for connection to a supply line for a hot water radiator and an inlet adapted for connection to a return line from the radiator; a circulator adapted to force water from the boiler through the supply line, radiator and return line; a domestic water supply heat exchanger in said boiler having an inlet adapted for connection to a cold water supply conduit and an outlet adapted for connection to a hot water service conduit, a control member adapted to be connected in one of said conduits, said control member being movably mounted in such conduit and biased to remain stationary in a first position when there is no flow of water in the conduit and movable by the flow of water in the conduit to a second position, and connections between the control member and circulator for stopping the latter in response to movement of the control member from its first to its second position.

4. Heating apparatus, comprising, a hot water boiler having an outlet adapted for connection to a supply line for a hot water radiator and an inlet adapted for connection to a return line from the radiator; a pump adapted to force water from the boiler through the supply line, radiator and return line; electrical means for operating said pump, a domestic water supply heat exchanger in said boiler having an inlet adapted for connection to a cold water supply conduit and an outlet adapted for connection to a hot water service conduit, a control member adapted to be connected in one of said conduits, said control member being movably mounted in such conduit and biased to remain stationary in a first position when there is no flow of water in the conduit and being movable by the flow of water in the conduit to a second position, and a switch in circuit with said electrical means and opened by movement of the control member from its first to its second position and closed by movement of the control member from its second to its first position.

5. Heating apparatus, comprising, a hot water boiler having an outlet adapted for connection to a supply line for a hot water radiator and an inlet adapted for connection to a return line from the radiator; a circulator adapted to force water from the boiler through the supply line, radiator and return line; a normal control for said circulator adapted to respectively start and stop the same when there is a demand for heat from said apparatus and when said demand is satisfied, a domestic water supply heat exchanger in said boiler having an inlet adapted for connection to a cold water supply conduit and an outlet adapted for connection to a hot water service conduit, a second control member adapted to be connected in one of said conduits, said second control member being movably mounted in such conduit and biased to remain stationary in a first position when there is no flow of water in the conduit and movable by the flow of water in the conduit to a second position, and connections between the second control member and circulator operable by movement of the control member from its first to its second position to stop the circulator if the latter is operating under the first control and to prevent the circulator from being started by the first control if the circulator is stopped.

6. Heating apparatus, comprising, a hot water boiler having an outlet adapted for connection to a supply line for a hot water radiator and in inlet adapted for connection to a return line from the radiator; a pump adapted to force water from the boiler through the supply line, radiator and return line; electrical means for operating the pump, a first switch in circuit with said means for respectively starting and stopping the same when there is a demand for heat from said apparatus and when such demand is satisfied, a domestic water supply heat exchanger in said boiler having an inlet adapted for connection to a cold water supply conduit and an outlet adapted for connection to a hot water service conduit, a second switch in series with said means and first switch, and means responsive to flow and absence of flow in one of said conduits for respectively opening and closing the second switch.

7. In a water heater, in combination, heating means for supplying heat to water in the heater, a first conduit system for delivering water to, through and from the heater, thermostat means responsive to the temperature of water in the first conduit system, a heat exchanger in the heater and adapted to be heated by water therein, a second conduit system for delivering water to, through and from the heat exchanger, flow responsive means in the second conduit system, and control means responsive to the thermostat means for normally controlling the heating means to maintain the water in the heater at approximately a first temperature when the flow responsive means is not actuated by flow in the second conduit means and for controlling the heating means responsive to the thermostat means to maintain the water in the heater at a higher temperature when the flow responsive means is actuated by flow in the second conduit means.

8. In a water heater, in combination, heating means for supplying heat to water in the heater, a first conduit system for delivering water to, through and from the heater, a circulator for forcing water through the first conduit system, thermostat means responsive to the temperature of water in the first conduit system, a heat exchanger in the heater and adapted to be heated by water therein, a second conduit system for delivering water to, through and from the heat exchanger, flow responsive means in the second conduit system, and control means for normally controlling the heating means responsive to the thermostat means to maintain the water in the heater at approximately a first temperature as water is circulated through the first conduit system by the circulator subject to demand therefor when the flow responsive means is not actuated by flow in the second conduit system, and for controlling the heating means responsive to the thermostat means to maintain the water in the heater at a higher temperature and to stop or prevent the operation of the circulator when the flow responsive means is actuated by flow in the second conduit means.

9. In a water heater, in combination, heating means for supplying heat to water in the heater, a first conduit system for delivering water to, through and from the heater, a circulator for forcing water through the first conduit system, thermostat means responsive to temperature of water heated in the heater, a heat exchanger in the heater and adapted to be heated by water therein, a second conduit system for delivering water to, through and from the heat exchanger, flow responsive means in the second conduit system biased to a first position when there is no flow of water in the second conduit system and movable by flow of water in the second conduit system to a second position, and connections between the thermostat means, heating means, circulator and flow responsive means for controlling the heating means responsive to the thermostat means to maintain the water in the heater at approximately a first temperature when the flow responsive means is in the first position and for controlling the heating means responsive to the thermostat means to maintain the water in the heater at approximately a second, higher temperature and to stop or prevent operation of the circulator when the flow responsive means is in the second position.

References Cited in the file of this patent

UNITED STATES PATENTS

| | | |
|---|---|---|
| 1,731,368 | Baker | Oct. 15, 1929 |
| 2,006,035 | Stewart | June 25, 1935 |
| 2,572,253 | Fellows | Oct. 23, 1951 |
| 2,591,400 | Burklin | Apr. 1, 1952 |
| 2,644,641 | Clarkson | July 7, 1953 |